(12) United States Patent
Hidalgo et al.

(10) Patent No.: US 7,183,371 B2
(45) Date of Patent: Feb. 27, 2007

(54) METHOD FOR MAKING POLYCARBONATE

(75) Inventors: Gerardo Hidalgo, Cartagena Murcia (ES); Patrick J. McCloskey, Watervliet, NY (US); Alberto Nisoli, Niskayuna, NY (US); Lina Prada, Murcia (ES)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/979,479

(22) Filed: Nov. 1, 2004

(65) Prior Publication Data

US 2006/0094854 A1    May 4, 2006

(51) Int. Cl.
*C08G 64/00* (2006.01)

(52) U.S. Cl. ............. 528/196; 422/131; 502/150; 502/208; 502/270; 528/198

(58) Field of Classification Search ........... 422/131; 502/150, 208; 528/196, 198; 558/270
See application file for complete search history.

(56) References Cited

U.S. PATENT DOCUMENTS

| | | | | |
|---|---|---|---|---|
| 4,873,314 A * | 10/1989 | Berg et al. | ............ | 528/487 |
| 5,266,716 A | 11/1993 | Buysch et al. | | |
| 5,734,004 A | 3/1998 | Kuhling et al. | | |
| 5,747,609 A | 5/1998 | Komiya et al. | | |
| 5,922,287 A | 7/1999 | Kato et al. | | |
| 5,922,826 A * | 7/1999 | Kuze et al. | ............ | 528/196 |
| 5,929,192 A | 7/1999 | Miyauti et al. | ............ | 528/196 |
| 6,228,973 B1 | 5/2001 | McCloskey et al. | ........ | 528/196 |
| 6,277,945 B1 | 8/2001 | Hachiya et al. | | |
| 6,316,575 B1 | 11/2001 | Kuze et al. | | |
| 6,323,302 B1 | 11/2001 | Sasaki et al. | | |
| 6,339,138 B1 | 1/2002 | van Hout et al. | ........ | 528/196 |
| 6,403,754 B1 | 6/2002 | McCloskey et al. | | |
| 6,472,498 B2 | 10/2002 | Sugise et al. | | |
| 6,506,871 B1 | 1/2003 | Silvi et al. | | |
| 6,740,729 B1 | 5/2004 | Tanaka et al. | | |
| 2002/0095020 A1 | 7/2002 | Hucks et al. | ........ | 528/196 |
| 2003/0050427 A1 | 3/2003 | Brunelle et al. | | |
| 2003/0236384 A1 | 12/2003 | Silvi et al. | ........ | 528/86 |
| 2005/0010063 A1 * | 1/2005 | Murthy et al. | ........ | 558/270 |

FOREIGN PATENT DOCUMENTS

| | | |
|---|---|---|
| EP | 1018529 | 7/2000 |
| JP | 10060106 | 3/1998 |
| JP | 2000128976 | 5/2000 |
| LU | 88564 | 4/1995 |
| LU | 88569 | 4/1995 |
| WO | 9303084 | 2/1993 |

OTHER PUBLICATIONS

Hidalgo, et al. "Method for Making Polycarbonate" US Application Filed Nov. 1, 2004. pp. 1-22.
International Search Report, International Application No. PCT/US2005/038553, International Filing Date: Oct. 27, 2005, Date of Mailing: Mar. 8, 2006, 6 pages.
International Search Report, International Application No. PCT/US2005/038376, International Filing Date: Oct. 27, 2005, Date of Mailing: Mar. 3, 2006, 4 pages.
JP Patent No. 10060106; Publication Date Mar. 3, 1998; Abstract Only; 1 page.
JP2000128976; May 9, 2000; Masanori; Manufacturing Method of Polycarbonate; Abstract only 1 page.

* cited by examiner

*Primary Examiner*—Terressa Boykin

(57) ABSTRACT

A method of making polycarbonate comprises melt-polymerizing an aromatic dihydroxy compound and a carbonic acid diester in a presence of a polymerization catalyst in a reactor system producing a byproduct stream, wherein the polymerization catalyst comprises a quaternary phosphonium compound; and purifying the byproduct stream to separate the carbonic acid diester, wherein the separated carbonic acid diester has a phosphorous concentration of less than or equal to about 30 parts per million.

20 Claims, 1 Drawing Sheet

METHOD FOR MAKING POLYCARBONATE

BACKGROUND

This disclosure is directed to a method for manufacturing polycarbonates.

Aromatic polycarbonates have been widely adopted for use as engineering plastics in many fields because of their excellent mechanical properties such as high impact resistance, heat resistance, transparency, and the like.

Polycarbonates can be manufactured by reacting an aromatic dihydroxy compound with a carbonic acid diester in the presence of a polymerization catalyst. For example, the method of making an aromatic polycarbonate generally comprises an ester interchange reaction (melt polymerization method) between an aromatic dihydroxy compound and a carbonic acid diester using an alkali metal salt as the catalyst. It is noted that this method of manufacturing aromatic polycarbonates has attracted recent attention because it is inexpensive and does not employ toxic substances such as phosgene and methylene chloride. As such, this method is more advantageous from a health and environmental perspective compared to other methods employing, for example, phosgene and methylene chloride.

Separation and reuse of byproducts and recyclable components from a polymerization reaction is important, if a method to prepare polycarbonates is to be economically viable and environmentally safe. In particular, when a reactant like diphenyl carbonate is separated in the polymerization reaction, it is desirable that a reusable form of the reactant be separated and recycled efficiently.

SUMMARY

Disclosed herein are methods of making polycarbonate.

One embodiment of a method of making polycarbonate can comprise melt-polymerizing an aromatic dihydroxy compound and a carbonic acid diester in a presence of a polymerization catalyst in a reactor system producing a byproduct stream, and purifying the byproduct stream to separate the carbonic acid diester. The polymerization catalyst can comprise a quaternary phosphonium compound, and the separated carbonic acid diester can have a phosphorous concentration of less than or equal to about 30 ppm, based upon the total weight of the carbonic acid diester separated.

Another embodiment of a method for making polycarbonate can comprise melt-polymerizing bisphenol A and diphenyl carbonate in the presence of tetrabutylphosphonium acetate and sodium hydroxide in a multistage reactor comprising a first reactor, a second reactor disposed downstream of the second reactor, a third reactor disposed downstream of the second reactor, and a fourth reactor disposed downstream of the third reactor. The first reactor can comprise a first reactor byproduct stream; the second reactor can comprise a second reactor byproduct stream; the third reactor can comprise a third reactor byproduct stream; and the fourth reactor can comprise a fourth reactor byproduct stream. Phenol can be separated from the first reactor byproduct stream using a scrubber disposed in fluid communication with the first reactor; and separated from the second, third, and fourth byproduct streams using a first distillation column, wherein the first distillation column produces a first top stream and a first bottom stream. Phenol can be separated from the first bottom stream using a second distillation column, wherein the second distillation column produces a second top stream and a second bottom stream. Diphenyl carbonate can be separated from the second bottom stream using a third distillation column, wherein the third distillation column produces a third top stream and a third bottom stream, wherein the diphenyl carbonate separated can comprise a phosphorous concentration of less than or equal to about 30 parts per million, based upon a total net weight of the carbonic acid diester separated.

The above-described and other features will be appreciated and understood by those skilled in the art from the following detailed description, drawings, and appended claims.

BRIEF DESCRIPTION OF THE DRAWINGS

Referring now to the figure, which is an exemplary embodiment and wherein the like elements are numbered alike.

DETAILED DESCRIPTION

Figure 1:
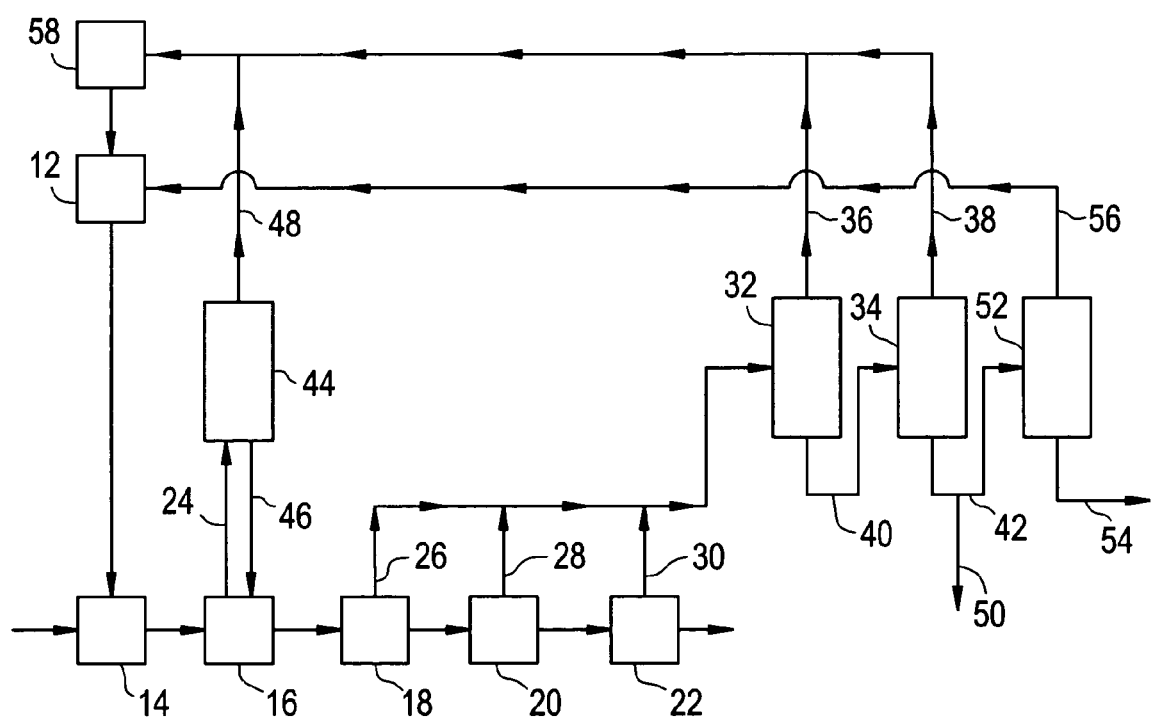
FIG. 1 is a schematic diagram illustrating an exemplary embodiment of a system suitable for making polycarbonate.

It is first noted that the terms "first," "second," and the like, herein do not denote any amount, order, or importance, but rather are used to distinguish one element from another, and the terms "a" and "an" herein do not denote a limitation of quantity, but rather denote the presence of at least one of the referenced item. Additionally, all ranges disclosed herein are inclusive and combinable (e.g., the ranges of "up to 25 wt. %, with 5 wt. % to 20 wt. % desired," are inclusive of the endpoints and all intermediate values of the ranges of "5 wt. % to 25 wt. %," etc.). Unless defined otherwise, technical and scientific terms used herein have the same meaning as is commonly understood by one of skill in the art. The modifier "about" used in connection with a quantity is inclusive of the stated value and has the meaning dictated by the context, (e.g., includes the degree of error associated with measurement of the particular quantity).

Additionally, it is noted that the phrase "net total weight" is used throughout this disclosure in regards to a given material being separated. It is to be understood by those skilled in the art that this phrase refers to a material balance of the given material exiting the separation device (e.g., purifying column, distillation column, and the like). For example, if a distillation column comprises a top stream and a bottom stream, wherein 90 wt. % of a given material is in the top stream based upon a total weight of the given material separated, the remaining 10 wt. % is in the bottom stream. Moreover, it is to be understood that this information can readily be manipulated by one of skill in the art to determine the weight percent of the given material based on a total weight of materials in one stream, e.g., the top stream.

In describing the arrangement of devices (e.g., reactors, purifying devices, and the like) within a system, the terms "upstream" and "downstream" are used. These terms have their ordinary meaning. However, it is envisioned that a device may be both "upstream" and "downstream" of the same device in certain configurations, e.g., a system comprising a recycle loop.

Polycarbonates can be prepared by reacting an aromatic dihydroxy compound with a carbonic acid diester in the presence of a polymerization catalyst. Suitable polymerization catalysts include, but are not limited to, a phosphorous containing compound (e.g., a quaternary phosphonium compound). The carbonic acid diester employed in making the polycarbonate comprises a phosphorous concentration of less than or equal to about 30 parts per million, based upon the total weight of the carbonic acid diester. Suitable aromatic polycarbonates can possess recurring structural units of the formula (I):

wherein A is a divalent aromatic radical of the dihydroxy compound employed in the polymer reaction.

The aromatic dihydroxy compound that can be used to form aromatic carbonate polymers, are mononuclear or polynuclear aromatic compounds, containing as functional groups two hydroxy radicals, each of which can be attached directly to a carbon atom of an aromatic nucleus. Suitable dihydroxy compounds are, for example, resorcinol, 4-bromoresorcinol, hydroquinone, 4,4'-dihydroxybiphenyl, 1,6-dihydroxynaphthalene, 2,6-dihydroxynaphthalene, bis(4-hydroxyphenyl)methane, bis(4-hydroxyphenyl) diphenylmethane, bis(4-hydroxyphenyl)-1-naphthylmethane, 1,1-bis(4-hydroxyphenyl) methane, 1,1-bis(4-hydroxyphenyl)ethane, 1,2-bis(4-hydroxyphenyl) ethane, 1,1-bis(4-hydroxyphenyl)-1-phenylethane, 2,2-bis (4-hydroxyphenyl)propane ("bisphenol A"), 2-(4-hydroxyphenyl)-2-(3-hydroxyphenyl)propane 2,2-bis(4-hydroxyphenyl)butane, 2,2-bis(4-hydroxyphenyl) octane, 1,1-bis(4-hydroxyphenyl)propane, 1,1-bis(4-hydroxyphenyl)$_n$-butane, bis(4-hydroxyphenyl)phenylmethane, 2,2-bis (4-hydroxy-1-methylphenyl) propane, 1,1-bis(4-hydroxy-tert-butylphenyl)propane, 2,2-bis(4-hydroxy-3-bromophenyl)propane, and 1,1-bis (hydroxyphenyl) cyclopentane, 1,1-bis(4-hydroxyphenyl)cyclohexane, 1,1-bis(4-hydroxyphenyl)isobutene, 1,1-bis(4-hydroxyphenyl) cyclododecane, trans-2,3-bis(4-hydroxyphenyl)-2-butene, 2,2-bis(4-hydroxyphenyl)adamantine, alpha.alpha.'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane 2,2-bis(3-cyclohexyl-4-hydroxyphenyl)propane, 2,2-bis(3-allyl-4-hydroxyphenyl)propane, 2,2-bis(3-methoxy-4-hydroxyphenyl)propane, 2,2-bis(4-hydroxyphenyl)hexafluoropropane, 1,1-dichloro-2,2-bis(4-hydroxyphenyl)ethylene, 1,1-dibromo-2,2-bis(4-hydroxyphenyl) ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, 2,7-dihydroxycarbazole and the like, as well as combinations and reaction products comprising at least one of the foregoing dihydroxy compounds.

In various embodiments, two or more different aromatic dihydroxy compounds or a copolymer of an aromatic dihydroxy compound with a glycol, with a hydroxy- or acid-terminated polyester or with a dibasic acid or hydroxy acid in the event a carbonate copolymer or interpolymer rather than a homopolymer for use in the preparation of the aromatic polycarbonate mixtures, can be employed in making the polycarboante. Polyarylates, polyester-carbonate resins, and/or blends comprising at least one of the foregoing can be employed. In an exemplary embodiment, the aromatic dihydroxy compound is bisphenol A.

Examples of carbonic acid diesters suitable for use, include, but is not limited to, diphenyl carbonate, ditolyl carbonate, bis(chlorophenyl) carbonate, m-cresyl carbonate, dinaphthyl carbonate, bis(diphenyl) carbonate, diethyl carbonate, diethyl carbonate, dibutyl carbonate, and dicyclohexyl carbonate, and the like, as well as combinations and reaction products comprising at least one of the foregoing carbonic acid diesters. More particularly, the carbonic acid diester can be diphenyl carbonate (DPC).

The method to produce diphenyl carbonate involves reaction of an aromatic monohydroxy compound, which is convertible to a carbonate ester. Suitable aromatic hydroxy compounds include monocyclic, polycyclic or fused polycyclic aromatic monohydroxy or polyhydroxy compounds having from 6 to 30, and particularly from 6 to 15 carbon atoms. Illustrative examples include mono- and poly-hydroxy compounds such as phenol, alkylphenols, o-, m- and p-cresol, o-, m- and p-chlorophenol, o-, m- and p-ethylphenol, o-, m- and p-propylphenol, o-, m- and p-methoxyphenol, methyl salicylate, 2,6 dimethylphenol, 2,4-dimethylphenol, 1-naphthol, 2-naphthol, xylenol, resorcinol, hydroquinone, catechol, cumenol, the various isomers of dihydroxynaphthalene, bis(4-hydroxyphenyl)propane-2,2, alpha.,alpha-bis(4-hydroxyphenyl)-p-di isopropylbenzene, bisphenol A, and the like, as well as combinations and reaction products comprising at least one of the foregoing can be used. Particularly, the aromatic monohydroxy compound can be phenol.

In preparing the aromatic polycarbonates, about 1.0 mole to about 1.30 moles of carbonic acid diester can be used for every mole of the aromatic dihydroxy compound. More particularly, about 1.01 moles to about 1.15 moles of carbonic acid diester can be employed.

In an embodiment, the catalyst composition comprises a quaternary phosphonium compound. Quaternary phosphonium compounds include quaternary phosphonium compounds having structure II

wherein $R^{17}$–$R^{20}$ are independently a $C_1$–$C_{20}$ alkyl group, $C_4$–$C_{20}$ cycloalkyl group, or a $C_4$–$C_{20}$ aryl group; and X— is an organic or inorganic anion.

Quaternary phosphonium compounds II are illustrated by tetamethylphosphonium hydroxide, tetrabutylphosphonium acetate, tetrabutylphosphonium hydroxide, and the like, and combinations comprising one or more of the foregoing compounds.

In structure II, the anion X— is hydroxide, halide, carboxylate, phenoxide, sulfonate, sulfate, carbonate, or bicarbonate. Where X— is a polyvalent anion such as carbonate or sulfate it is understood that the positive and negative charges in structure II are properly balanced. For example, in tetrabutylphosphonium carbonate where $R_{17}$–$R_{20}$ in structure II are each butyl groups and X— represents a carbonate anion, it is understood that X— represents $\frac{1}{2}(CO_3^{-2})$.

The catalyst further comprises an alkali element compound, an alkaline earth metal compound, or a combination comprising one or more of the foregoing catalysts. Examples of suitable alkali elements include lithium, sodium, potassium, cesium, and rubidium, while examples of alkaline earth metals include magnesium calcium, and strontium. Examples of alkali element compounds include sodium hydroxide, potassium hydroxide, lithium hydroxide, sodium bicarbonate, potassium bicarbonate, lithium bicarbonate, sodium carbonate, potassium carbonate, lithium carbonate, sodium acetate, potassium acetate, lithium acetate, lithium stearate, sodium stearate, potassium stearate, lithium hydroxyborate, sodium hydroxyborate, sodium phenoxyborate, sodium benzoate, potassium benzoate, lithium benzoate, disodium hydrogen phosphate, dipotassium hydrogen phosphate, dilithium hydrogen phosphate, disodium salts, dipotassium salts, and dilithium salts of bisphenol A, and sodium salts, potassium salts, and lithium salts of phenol, and combinations comprising one or more of the foregoing alkali element compounds. Examples of alkaline earth metal compounds include calcium hydroxide, barium hydroxide, magnesium hydroxide, strontium hydroxide, calcium bicarbonate, barium bicarbonate, magnesium bicarbonate, strontium bicarbonate, calcium carbonate, barium carbonate, magnesium carbonate, strontium carbonate, calcium acetate, barium acetate, magnesium acetate, strontium acetate, and strontium stearate, and combinations comprising one or more of the foregoing alkaline earth metal compounds.

The catalyst can further comprise at least one salt of a non-volatile acid. By "non-volatile" it is meant that the acid from which the catalyst is made has no appreciable vapor pressure under melt polymerization conditions. Examples of non-volatile acids include phosphorous acid, phosphoric acid, sulfuric acid, and metal "oxo acids" such as the oxo acids of germanium, antimony, niobium and the like. Salts of non-volatile acids include alkali metal salts of phosphites; alkaline earth metal salts of phosphites; alkali metal salts of phosphates; alkaline earth metal salts of phosphates, alkali metal salts of sulfates, alkaline earth metal salts of sulfates, alkali metal salts of metal oxo acids, and alkaline earth metal salts of metal oxo acids. Specific examples of salts of non-volatile acids include $NaH_2PO_3$, $NaH_2PO_4$, $Na_2HPO_4$, $KH_2PO_4$, $CsH_2PO_4$, $Cs_2HPO_4$, $NaKHPO_4$, $NaCsHPO_4$, $KCsHPO_4$, $Na_2SO_4$, $NaHSO_4$, $NaSbO_3$, $LiSbO_3$, $KSbO_3$, $Mg(SbO_3)_2$, $Na_2GeO_3$, $K_2GeO_3$, $Li_2GeO_3$, $MgGeO_3$, $Mg_2GeO_4$, and combinations comprising one or more of the foregoing compounds.

In various embodiments, the amount of tetraalkylphosphonium compound employed can be about 1 micro equivalents to about 1000 micro equivalents based on the amount of aromatic dihydroxy compound. Particularly, about 10 micro equivalents to about 500 micro equivalents can be employed. More particularly, about 50 micro equivalents to about 150 micro equivalents can be employed.

The amount of alkali element compound, an alkaline earth metal compound, or combination comprising one or more of the foregoing catalysts is employed can be about $1 \times 10^{-7}$ moles to about $2 \times 10^{-3}$ moles, specifically about $1 \times 10^{-6}$ to about $4 \times 10^{-4}$ moles for each mole of the combination of the aromatic dihydroxy compound comonomer and the carbonic acid diester.

When a quarternary phosphonium compound is used as one of the polymerization catalysts, it decomposes at temperatures greater than or equal to about 180° C. yielding non ionic compounds such as a tertiary phosphine oxide and phosphate esters. For example, when tetrabutylphosphonium acetate is employed as the tertiary phosphonium compound, tributyl phosphine oxide (TBPO) and phosphate esters are produced. TBPO, however, is volatile and can be vaporized under the conditions of the polymerization reaction. During processing, because TBPO has a similar vapor pressure as diphenyl carbonate, for example, a significant amount of the TBPO can be distilled with the diphenyl carbonate. A fraction of the TBPO generated thus can be recycled with recovered diphenyl carbonate.

In an embodiment of making polycarbonate, the bisphenol compound and the carbonate diester can be reacted at atmospheric pressure during the first stage reaction at a temperature of about 80° C. to about 250° C., particularly at a temperature of about 100° C. to about 230° C., and more particularly at a temperature of about 120° C. to about 190° C., and in general for 0 to about 5 hours, particularly for 0 to about 4 hours, and even more particularly for 0 to about 3 hours. The reaction temperature is then raised, while the reaction system is reduced in pressure, thus bringing about a reaction between the bisphenol and the carbonic acid diester, and finally the bisphenol, the carbonic acid diester, and their oligomers are subjected to a polymerization reaction at a temperature of about 240° C. to about 320° C. under reduced pressure of less than or equal to about 5 millimeters of mercury (mm Hg).

The manufacturing method can be either a continuous or batch process. The reaction apparatus used in conducting this reaction can be a horizontal type, tube type, or column type. In an embodiment, there can be at least two polymerization stages, although there are no particular restrictions on the number of stages.

In an exemplary embodiment, the apparatus in which the reaction is carried out can be a multistage reactor comprising any suitable type of tank, tube, and/or column. Such reactors can be vertical stirred tank polymerization reactors, thin film evaporative polymerization reactors, horizontal stirred reactors, twin screw vented extruders, reactive distillation columns, and the like, as well as combinations comprising at least one of the foregoing reactors.

Referring now to FIG. 1, a schematic diagram of an exemplary embodiment for a process flow suitable for the practice of the present method generally designated 100 is illustrated. The carbonic acid diester and the aromatic dihydroxy compound along with the quaternary phosphonium compound and optionally other polymerization catalysts, are mixed in the monomer mix drum 14. It is noted that in an embodiment the carbonic acid diester is diphenyl carbonate (DPC), which can be supplied to mix drum 14 via DPC tank 12, as will be discussed in greater detail below. The polymerization reaction to make polycarbonate can occur in a multistage reactor system comprising a first reactor 16, a second reactor 18, a third reactor 20, and a fourth reactor 22 connected in series and operated at increasing temperature (i.e., a reactor down stream is operated at a greater temperature than a reactor upstream) of about 150° C. to about 400° C., particularly about 250° C. to about 350° C.; and decreasing pressure (i.e., a reactor down stream is operated at a lower pressure than a reactor upstream) of about 500 Torr to about 0.01 Torr. For example, first reactor 16 is maintained at a temperature greater than or equal to about 200° C. and fourth reactor 22 is maintained at a temperature less than or equal to about 350° C. Moreover, first reactor 16 is maintained at a pressure less than or equal to about 500 Torr and fourth reactor 22 is maintained at a pressure greater than or equal to about 0.01 Torr. This method allows phenol byproduct to be removed, while building high molecular weight polycarbonate, e.g., with number average molecular weight greater than or equal to about 7,000 atomic mass units (amu).

Reactors 16, 18, 20, and 22 are configured to allow removal of byproducts (e.g., phenol) as an overhead (byproduct) stream 24, 26, 28, and 30 respectively for each reactor. As will be discussed in greater detail, additional separation methods are used to further separate the byproducts contained in overhead streams 24, 26, 28, and 30. For example, phenol can be separated from overhead stream 24 from first reactor 16. More particularly, overhead stream 24 is fed to a purification device (e.g., scrubber 44) in fluid communication with first reactor 16. Scrubber 44 comprises a bottom stream 46 and top stream 48. Bottom stream 46 can comprise diphenyl carbonate (DPC), bisphenol A (BPA), and quaternary phosphonium compound (e.g., tetrabutylphosphonium acetate (TBPA)) decomposition products, which can be fed back to reactor 16. Top stream 48 comprises greater than or equal to about 99 wt. % phenol, wherein the weight percent of phenol is based upon a net weight of the phenol separated, and a phosphorous concentration of less than or equal to about 3 part per million (ppm) by weight, more particularly less than or equal to about 1 ppm by weight. The phenol recovered in top stream 48 can be recycled to a monomer (diphenyl carbonate) plant 58 without further purification.

Additionally, phenol can be separated from overhead streams 26, 28, and 30, which can comprise phenol, diphenyl carbonate, bisphenol A, and quaternary phosphonium compound decomposition products. When the quaternary phosphonium compound is tetrabutylphosphonium acetate, the majority (i.e., greater than about 50 wt. %) of the tetrabutylphosphonium acetate decomposition products comprise tributyl phosphine oxide (TBPO). At the above specified reaction conditions, TBPO is relatively volatile and can be vaporized, aiding in its separation. Overhead streams 26, 28, and 30 can be collectively fed to a recovery system (e.g., purification system) comprising a first purifying column 32, a second purifying column 34, and a third purifying column 52.

First purifying column 32 is in serial fluid communication with second purifying column 34, and third purifying column 52. Purifying columns (32, 34, and 52) can be, for example, distillation columns. Moreover, first purifying column 32 comprises a top stream 36 and a bottom stream 40, wherein top stream 36 comprises greater than or equal to about 99 wt. % phenol, wherein the weight percent of phenol is based upon a net weight of the phenol separated in the first purifying column 32, and a phosphorous concentration of less than or equal to about 3 ppm by weight, more particularly less than or equal to about 1 ppm by weight. The phenol recovered in top stream 36 can be recycled to the diphenyl carbonate plant 58 without further purification. Bottom stream 40 can comprise residual phenol, diphenyl carbonate, bisphenol A, and quaternary phosphonium compound decomposition products (e.g., tributyl phosphine oxide), which is fed to second purifying column 34.

First purifying column 32 can be operated under conditions suitable to obtain the desired separation of phenol. For example, the first purifying column 32 can be operated at a temperature of about 100° C. to about 220° C., a pressure of about 90 millibars (mbar) to about 150 mbar, and a reflux ratio of about 0.5 to about 5.

Second purifying column 34 is in serial fluid communication with third purifying column 52, and comprises a top stream 38 and a bottom stream 42, wherein top stream 38 comprises 90 wt. % phenol, based upon a net weight of the phenol separated in the second purifying column 34, and a phosphorous concentration of less than or equal to about 3 ppm by weight, more particularly less than or equal to about 1 ppm by weight. The phenol recovered in top stream 38 can be recycled to the diphenyl carbonate plant 58 without further purification. Bottom stream 42 can comprise diphenyl carbonate, bisphenol A, and tertiary phosphonium compound decomposition products (e.g., tributyl phosphine oxide).

Second purifying column 34 can be operated under conditions suitable to obtain the desired separation of phenol. For example, the second purifying column 34 can be operated at a temperature of about 70° C. to about 220° C., a pressure of about 20 mbar to about 100 mbar, and a reflux ratio of about 2 to about 20.

Bottom stream 42 from second purifying column 34 can be fed to the diphenyl carbonate (DPC) purifying column 52 (e.g., third purifying column 52) to separate the diphenyl carbonate contained in stream 42 from bisphenol A. Since TBPO has comparable vapor pressure with the diphenyl carbonate, a significant amount of the TBPO (e.g., greater than or equal to about 50 wt. %, wherein weight percents are based on a net weight of TBPO separated in the third purifying column) is purified together with the DPC product and sent to the DPC tank 12 that feeds the polymerization plant. Therefore, part of the TBPO generated by the phosphorous containing catalyst, e.g., tetrabutylphosphonium acetate, in the polymerization process is recycled back via a top stream 56 to the same polymerization process along with the separated diphenyl carbonate. The diphenyl carbonate product separated from the recovery system in top stream 56 comprises a phosphorous concentration less than or equal to about 30 ppm by weight. Further, top stream 56 comprises greater than or equal to about 99 wt. % diphenyl carbonate, wherein the weight percent of diphenyl carbonate is based on the total net weight of the diphenyl carbonate separated in the third purifying column.

Third purifying column 52 can be operated under conditions suitable to obtain the desired separation of diphenyl carbonate. For example, the third purifying column 52 can be operated at a temperature of about 140° C. to about 240° C., a pressure of about 2 mbar to about 60 mbar, and a reflux ratio of about 0.1 to about 2.

To minimize the amount of TBPO returned in top stream 56, DPC purifying column 52 can be configured to allow the removal of TBPO. DPC purifying column 52, therefore, in addition to purifying the DPC product, ensures that part of the TBPO is purged from bottom stream 54 to avoid accumulation. An additional purge point 50 can also be located upstream of the third purifying column 52, for removing TBPO.

EXAMPLES

Example 1

In this example a commercial facility for the production of melt polycarbonate was used. The process flow diagram was according to FIG. 1. Molten bisphenol A, molten diphenyl carbonate, and $1.5 \times 10^{-4}$ moles of tetrabutylphosphonium acetate (TBPA) per mol of bisphenol A and less than $1 \times 10^{-6}$ moles of sodium hydroxide (NaOH) per mol of bisphenol A were continuously supplied to the prepolymerization/oligomerization reactors (e.g., 16,18). Oligomerization and polymerization were carried out according to operating conditions where the temperature was increased (157° C. to 300° C.) along the process and the pressure was decreased along the process (atmospheric to 1 Torr).

In this example total phosphorous was measured in various streams as it is shown in Table 1.

TABLE 1

| Byproduct Stream | P [ppm] |
|---|---|
| 48 | <0.5 |
| 26 + 28 + 30 | 44 |
| 40 | 126 |
| 36 | <0.5 |
| 42 | 130 |
| 38 | <0.5 |
| 54 | 60 (calc.) |
| 56 | 5.2 |
| 12 | 3.6 |

The phenol collected from stream 48, was virtually free from phosphorous (i.e., the stream comprises a phosphorous concentration less than the detection limit), and could be recycled for making diphenyl carbonate.

The difference in phosphorus content between stream 56 and DPC tank 12 suggested that the TBPO concentration in the DPC tank 12 had not yet reached steady state. Nevertheless, it was possible to calculate what the steady state TBPO concentration in the tank would be, based on the split factor of phosphorous in the various streams of the process. By doing a mass balance of TBPO for the block flow diagram shown in FIG. 1 the following expression was derived:

$$x_R = \frac{(1-S_1)S_2 P_{in}}{F_{DPC}(1-S_2+y)}$$

where $x_R$=steady state recycle concentration of phosphorous in the tank [ppm]

$S_1$=split-ratio 1=phosphorous flow rate in polymer/phosphorous flow rate coming in with tetrabutylphosphonium acetate $S_2$=Split-ratio 2=TBPO flow rate in 56/TBPO flow rate in 42

$P_{in}$=P flow rate coming in with TBPA [kg/hr]

$F_{DPC}$=DPC flow rate to tank [kg/hr]

y=purge ratio=purge flow rate (50 flow rate)/(42 flow rate–50 flow rate)

The DPC collected in DPC tank 12 had a phosphorus concentration of less than 30 ppm and was fed back to the polymerization process.

Example 2

In this example a commercial facility for the production of melt polycarbonate was used. The process flow diagram is according to FIG. 1. Molten bisphenol A, molten diphenyl carbonate, and $1 \times 10^{-4}$ moles of tetrabutylphosphonium acetate (TBPA) per mol of bisphenol A and less than $1 \times 10^{-6}$ moles of sodium hydroxide (NaOH) per mol of bisphenol A were continuously supplied to the oligomerization reactors. Oligomerization and polymerization were carried out according to operating conditions where the temperature was increased (157° C. to 300° C.) along the process and the pressure was decreased along the process (atmospheric to 1 Torr).

In this example total phosphorous was measured in various streams as it is shown in Table 2.

TABLE 2

| Byproduct Stream | P [ppm] |
|---|---|
| 48 | <0.5 |
| 26 + 28 + 30 | 16 |
| 40 | 32 |
| 36 | <0.5 |
| 42 | 40 |
| 38 | <0.5 |
| 54 | 25 |
| 56 | 1.5 |
| 12 | 1 |

The phenol collected from byproduct stream 48 was virtually free from phosphorous (i.e., the stream comprises a phosphorous concentration less than the detection limit), and could be recycled for making DPC.

The DPC collected in the DPC tank 12 had a phosphorous concentration less than 30 ppm and was fed back to the polymerization process.

Advantageously, the methods disclosed herein minimize the amount of organic phosphorous recycled, thereby reducing the amount of organic phosphorous in the polycarbonate. It is noted that organic phosphorous in polycarbonate can be oxidized/hydrolyzed to phosphoric acid derivatives, which can cause hydrolytic stability issues in the polycarbonate resin. By reducing the organic phosphorous in the polycarbonate, these hydrolytic stability issues can advantageously be reduced.

While the present invention has been described with reference to an exemplary embodiment, it will be understood by those skilled in the art that various changes can be made and equivalents can be substituted for elements thereof without departing from the scope of the invention. In addition, many modifications can be made to adapt a particular situation or material to the teachings of the invention without departing from the invention scope thereof. It is, therefore intended that the invention not be limited to the particular embodiment disclosed as the best mode contemplated for carrying out this invention, but that the invention will include all embodiments falling within the scope of appended claims.

What is claimed is:

1. A method of making polycarbonate, comprising:
   melt-polymerizing an aromatic dihydroxy compound and a carbonic acid diester in a presence of a polymerization catalyst in a reactor system producing a byproduct stream, wherein the polymerization catalyst comprises a quaternary phosphonium compound; and
   purifying the byproduct stream to separate the carbonic acid diester, wherein the separated carbonic acid diester has a phosphorous concentration of less than or equal to about 30 parts per million.

2. The method of claim 1, wherein the dihydroxy compound is a bisphenol, wherein the carbonic acid diester is diphenyl carbonate, and wherein the quaternary phosphonium compound is tetrabutylphosphonium acetate.

3. The method of claim 1, wherein the reactor system comprises a first reactor and a second reactor disposed downstream of the first reactor, wherein the first reactor and the second reactor are each operated at about 150° C. to about 400° C., and wherein a second reactor temperature is greater than a first reactor temperature.

4. The method of claim 3, wherein the first reactor comprises a first reactor overhead stream in fluid communication with a scrubber.

5. The method of claim 3, wherein the reactor system further comprises a third reactor disposed downstream of the second reactor and a fourth reactor disposed downstream of the third reactor, wherein the second reactor and the third reactor are each operated at about 250° C. to about 350° C., and wherein a third reactor temperature is greater than a second reactor temperature and a fourth reactor temperature is greater than the third reactor temperature.

6. The method of claim 1, wherein the purifying the byproduct stream from the reactor system further comprises passing the byproduct stream through a purification system comprising a series of purifying columns to separate diphenyl carbonate.

7. The method of claim 6, wherein the byproduct stream comprises phenol, bisphenol A, diphenyl carbonate, and quaternary phosphonium compound decomposition products.

8. The method of claim 7, wherein the purification system comprises a first purifying column, a second purifying column disposed downstream of and in fluid communication with the first purifying column, and a third purifying column disposed downstream of and in fluid communication with the second purifying column.

9. The method of claim 8, wherein the first purifying column is operated at a first purifying column temperature of about 100° C. to about 220° C., a first purifying column pressure of about 90 mbar to about 150 mbar, and a first purifying column reflux ratio of about 0.5 to about 5.

10. The method of claim 9, wherein the second purifying column is operated at a second purifying column temperature of about 70° C. to about 220° C., a second purifying column pressure of about 20 mbar to about 100 mbar, and a second purifying column reflux ratio of about 2 to about 20.

11. The method of claim 8, wherein a first top stream of the first purifying column comprises greater than or equal to about 99 wt. % phenol and less than or equal to about 3 ppm phosphorous, wherein the weight percent of phenol is based upon a net weight of the phenol separated in the first purifying column.

12. The method of claim 11, wherein a second top stream of the second purifying column comprises greater than or equal to 99 wt. % phenol and less than or equal to about 3 ppm phosphorous, wherein the weight percent of phenol is based upon a net weight of the phenol separated in the second purifying column.

13. The method of claim 8, wherein a third top stream of the third purifying column comprises greater than or equal to 99 wt. % diphenyl carbonate and less than or equal to about 30 ppm phosphorus, wherein the weight percent of diphenyl carbonate is based upon a net weight of diphenyl carbonate separated in the third purifying column.

14. The method of claim 12, wherein the third purifying column is operated at a third purifying column temperature of about 140° C. to about 240° C., a third purifying column pressure of about 2 mbar to about 60 mbar, and a third purifying column reflux ratio of about 0.1 to about 2.

15. The method of claim 8, wherein the purification system comprises a purge point disposed between the second purifying column and the third purifying column.

16. A method for making polycarbonate, comprising:

melt-polymerizing bisphenol A and diphenyl carbonate in the presence of tetrabutylphosphonium acetate and sodium hydroxide in a multistage reactor comprising a first reactor, a second reactor disposed downstream of the second reactor, a third reactor disposed downstream of the second reactor, and a fourth reactor disposed downstream of the third reactor, wherein the first reactor comprises a first reactor byproduct stream, wherein the second reactor comprises a second reactor byproduct stream, wherein the third reactor comprises a third reactor byproduct stream, and wherein the fourth reactor comprises a fourth reactor byproduct stream;

separating phenol from the first reactor byproduct stream using a scrubber disposed in fluid communication with the first reactor;

separating phenol from the second, third, and fourth byproduct streams using a first distillation column, wherein the first distillation column produces a first top stream and a first bottom stream;

separating phenol from the first bottom stream using a second distillation column, wherein the second distillation column produces a second top stream and a second bottom stream; and separating diphenyl carbonate from the second bottom stream using a third distillation column, wherein the third distillation column produces a third top stream and a third bottom stream, wherein the diphenyl carbonate separated comprises a phosphorous concentration of less than or equal to about 30 parts per million, based upon a total net weight of the carbonic acid diester separated in the third distillation column.

17. The method of claim 16, further comprising recycling the diphenyl carbonate to the multistage reactor.

18. The method of claim 16, wherein the third top stream comprises greater than or equal to 99 wt. % diphenyl carbonate, wherein the weight percent of diphenyl carbonate is based upon a net weight of diphenyl carbonate separated in the third distillation column.

19. The method of claim 16, wherein the third distillation column is operated at a third distillation column temperature of about 140° C. to about 240° C., a third distillation column pressure of about 2 mbar to about 60 mbar, and a third distillation column reflux ratio of about 0.1 to about 2.

20. The method of claim 19, wherein the first distillation column is operated at a first distillation column temperature of about 100° C. to about 220° C., a first distillation column pressure of about 90 mbar to about 150 mbar, and a first distillation reflux ratio of about 0.5 to about 5; and wherein the second distillation column is operated at a second distillation column temperature of about 70° C. to about 220° C., a second distillation column pressure of about 20 mbar to about 100 mbar, and a second distillation column reflux ratio of about 2 to about 20.

* * * * *